Sept. 6, 1960  G. W. RODGERS ET AL  2,952,012
ANALOG-TO-DIGITAL DATA CONVERTER
Filed July 21, 1958  9 Sheets-Sheet 1

INVENTORS
George W. Rodgers
John E. Althouse
Davies P. Anderson
Gene R. Bussey
Leslie H. Minnear
BY
Attorney Time Base System Period Measurer Calibration Detector Transient and Segment Detector Sub-Com. Detector Sept. 6, 1960

G. W. RODGERS ET AL 2,952,012

ANALOG-TO-DIGITAL DATA CONVERTER

Filed July 21, 1958

Editor

INVENTORS
George W. Rodgers
John E. Althouse
Davies P. Anderson
Gene R. Bussey
Leslie H. Minnear

BY

Attorney

Sept. 6, 1960     G. W. RODGERS ET AL     2,952,012
ANALOG-TO-DIGITAL DATA CONVERTER
Filed July 21, 1958     9 Sheets-Sheet 9

Word Assembler

INVENTORS
George W. Rodgers
John E. Althouse
Davies P. Anderson
Gene R. Bussey
Leslie H. Minnear

BY

*Roland A. Anderson*

Attorney

ÚUnited States Patent Office 2,952,012
Patented Sept. 6, 1960

2,952,012

ANALOG-TO-DIGITAL DATA CONVERTER

George W. Rodgers, Albuquerque, N. Mex., John E. Althouse, San Diego, Calif., and Davies P. Anderson, Gene R. Bussey, and Leslie H. Minnear, Albuquerque, N. Mex., assignors, by mesne assignments, to the United States of America as represented by the United States Atomic Energy Commission Filed July 21, 1958, Ser. No. 750,054

4 Claims. (Cl. 340—347)

This invention relates to electrical measuring and recording apparatus, and more particularly to apparatus for converting electrical analog signals into a series of representative electrical pulses and recording the pulses for storage.

The invention will be described with reference to telemetering data and equipment, although it will be apparent that the apparatus is not confined to use therewith.

A common prior-art telemetering system is one known as the FM/FM System. It derives its name from the fact that the signal transmitted by the communications link is frequency modulated twice. A number of sub-carrier radio-frequency signals first are frequency modulated by analog voltages from measuring instruments or transducers in response to changes in the various phenomena being measured. The modulated subcarriers next are mixed together to form a composite signal which is used to frequency modulate the carrier. Thus, measurements of a large number of phenomena can be communicated by means of a single carrier.

The resulting FM/FM signal is transmitted to a receiving station where it is demodulated once yielding the composite signal which is commonly recorded on magnetic tape for storage until it is convenient to further demodulate the signal and to convert the resulting analog signals into digital readings. This conversion involves making photographic oscillographs of the analog signals which a human analyzer or editor then analyzes for placement of the digital readouts. Instead of taking readouts at equal increments of time throughout the duration of a signal, the human editor takes only a few readings if the signal is varying linearly and increases the frequency of readouts with decreasing linearity of the signal. A computer, working from the digital data, then is able to recreate the analog signal quite accurately by assuming linear changes between the digital readings. It is a general object of this invention to do the analog-to-digital conversion without the use of photographic oscillographs and without the use of a human editor, in a fraction of the time formerly required.

A feature of the present invention is the provision of an electronic editor as a substitute for the judgment exercised by the human editor in the prior art. The editor is capable of commanding the taking of readings at a frequency which varies according to the linearity of the analog signal being converted. Previous analog-to-digital converters designed to replace the human editor were limited to reading out at a fixed frequency, with the result that a large number of readings were made in excess of the number actually needed to represent the signal. For a typical telemetering signal, this type of conversion might result in 200 times as many readings as would result from the actions of a human editor, i.e., previous converters operated at 0.5% efficiency, assuming the human editor to work at 100% efficiency. In practice, the editor employed in this invention operates at about 75% efficiency, 150 times better than the prior devices.

It has been found through experience that, due to mechanical and electrical inaccuracies in the recording operation, variations in the frequency of the composite signal are introduced by the equipment. These variations are commonly known as "wow" and a number of attempts have been made to eliminate the effect from a recorded signal, such attempts being called "de-wowing." This invention is designed to use the composite signal reproduced from the magnetic tape as an input signal. This involves playing back the recorded signal, usually by the use of a different tape-transport mechanism than the one used originally in recording. This further distorts the signal, since new and different wow is added by the playback mechanism to the wow already present.

Another feature of this invention is the provision of means for dewowing each frequency-modulated subcarrier so that an accurate reproduction of the recorded signal can be made. The de-wowing process is based on recording a time base signal of constant frequency as part of the composite signal. On playback, all digital readings are made with reference to the recorded time base. Since any wow introduced by the recording and playback apparatus equally affects the time base signal and the information signals, there are no discrepancies between the two to cause inaccuracies in the digital readings. By combining an electronic vernier technique with this new de-wowing technique, a considerable gain in the accuracy of the analog-to-digital conversion has been realized.

The invention recovers the information contained in a frequency-modulated subcarrier by measuring the length of time required for a fixed number of subcarrier oscillations, i.e., by measuring a fixed number of subcarrier periods. This is equivalent to measuring the frequency of the subcarrier signal, as averaged over a number of oscillations. The averaging time will be known herein as a Period, capitalization being used to prevent confusion with the normal subcarrier period. Since the frequency of the subcarrier is proportional to an original modulating analog voltage produced by a transducer, the "frequency measurement" made at each readout is an indication of the state of the phenomenon represented.

Working in combination with the editor, several specialized detectors recognize the occurrence of certain non-analog or "event" types of telemetering data and command a readout in response thereto. Also there is provided a means for serially numbering the event readouts.

The digital readings of the information signal are recorded, along with time base readings and serial numbering (if appropriate) on a magnetic tape. This tape may be used to operate a computer or other analyzing equipment, or the data thereon can be transferred to other storage means. Equipment will be described which will transfer the magnetic tape data to punched cards.

A better understanding of the invention may be had, and other objects will become apparent upon reading the following more detailed description in conjunction with the attached drawing, in which.

Figure 3:
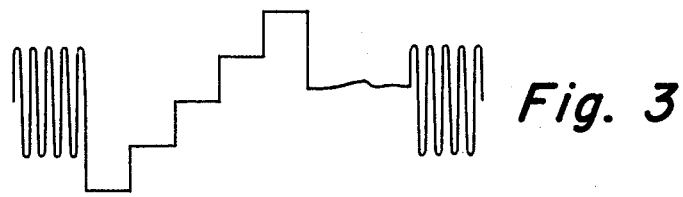
Figs. 3–8 are typical telemetering waveforms of voltage or frequency plotted against time, as follows.
Figure 4:
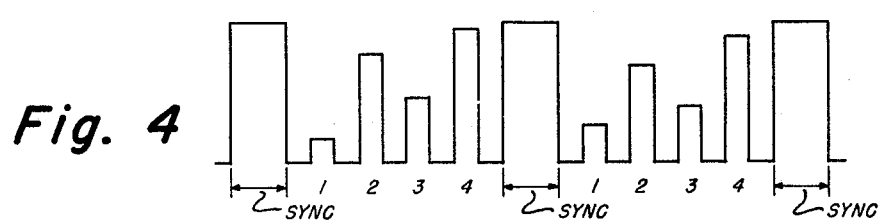
Figure 5:
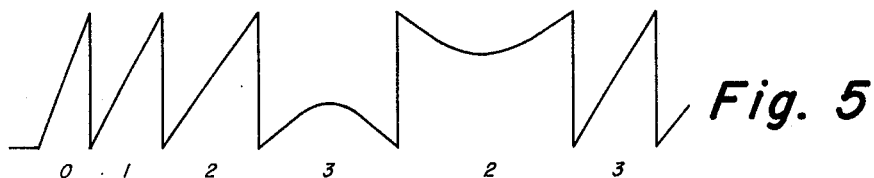
Figures 6, 7:
Figure 8:
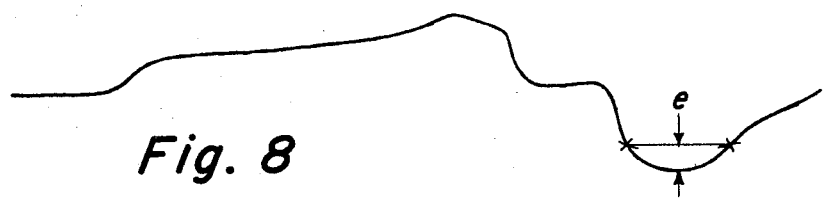
Figure 9:
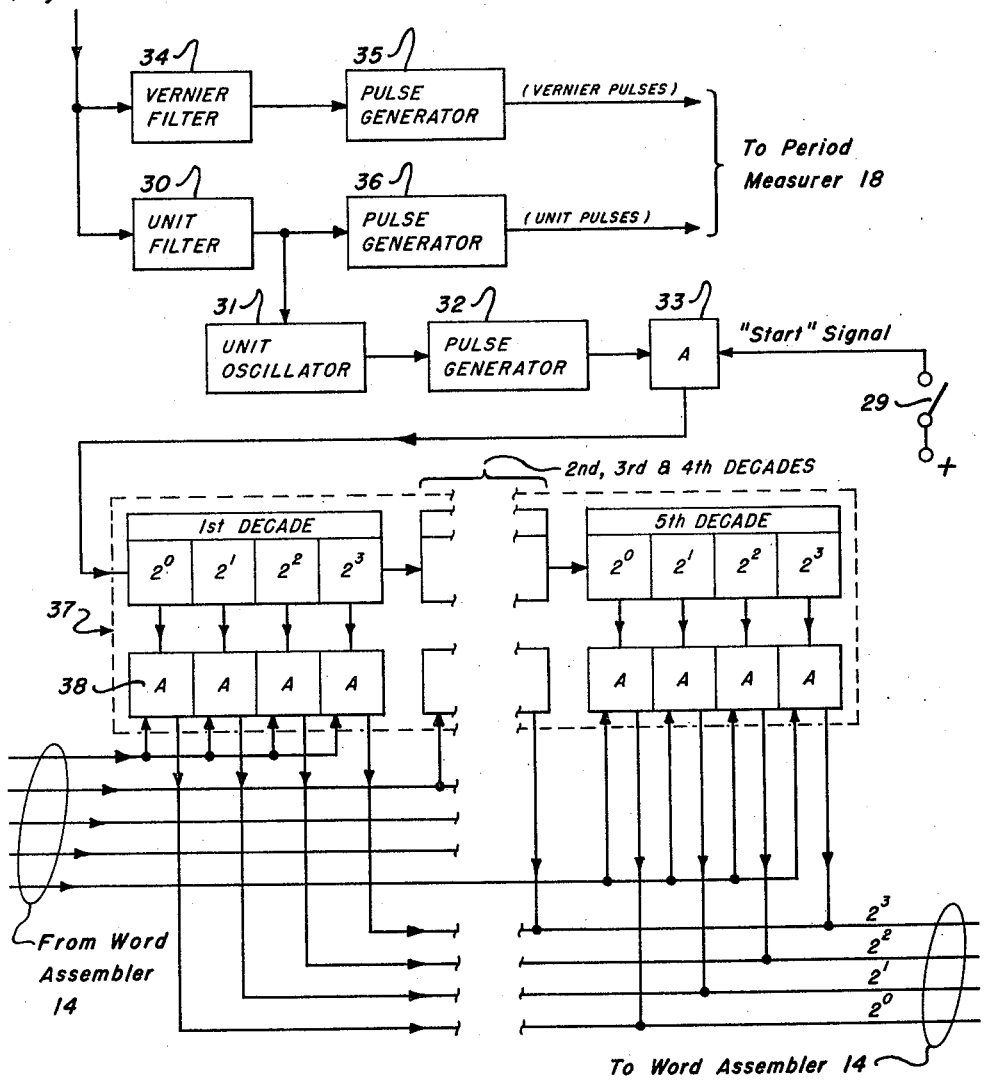
Figure 10:
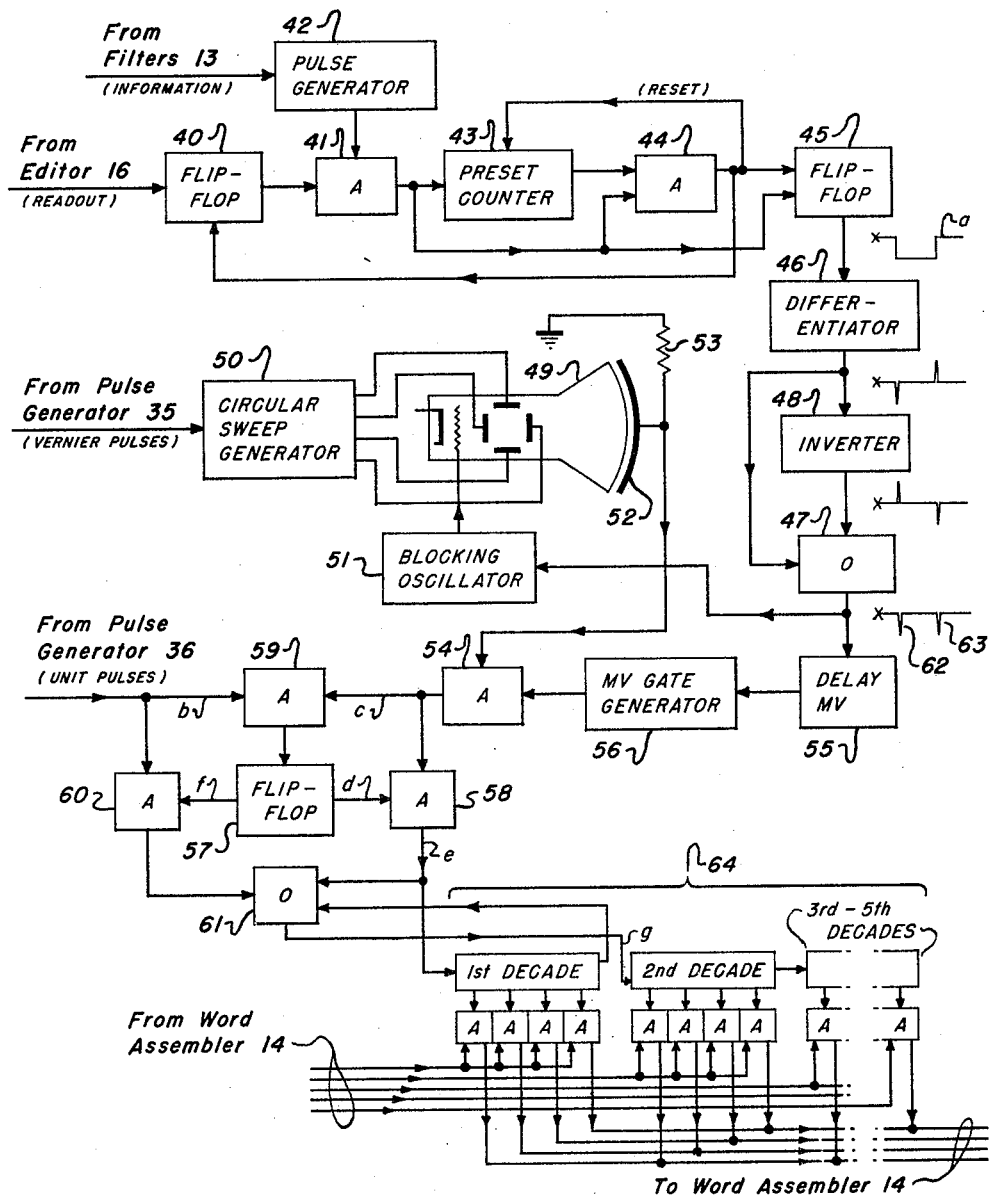
Figure 11:
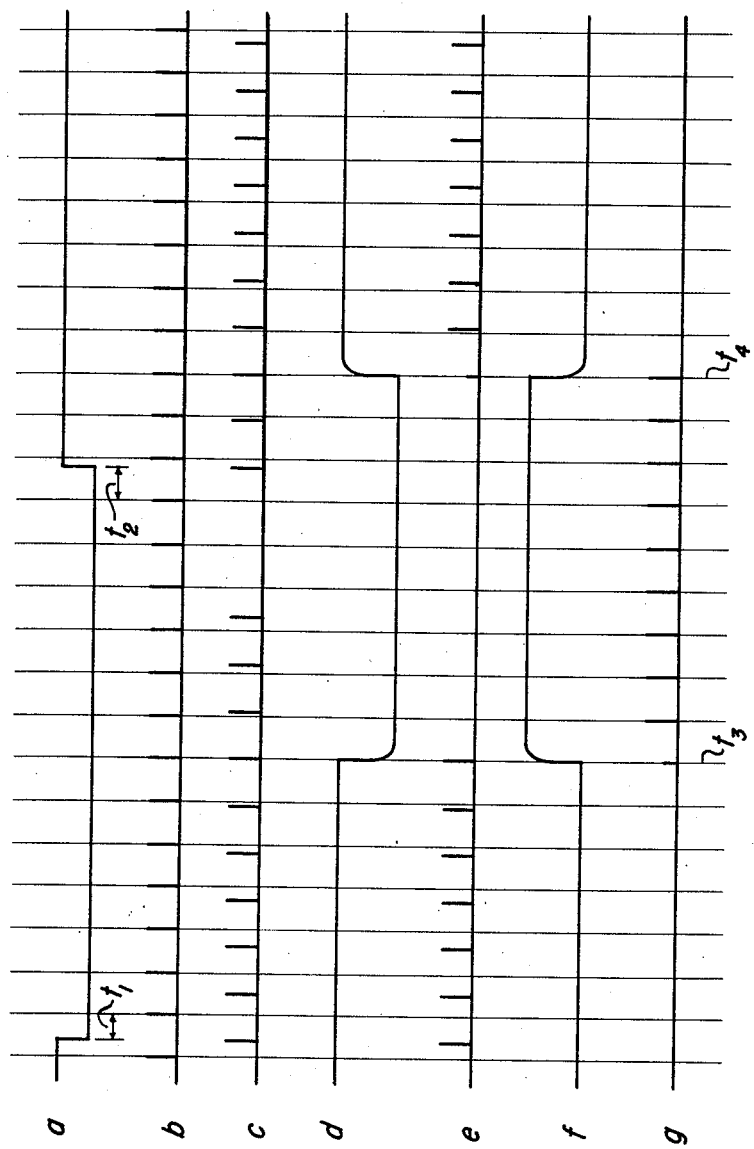
Figure 12:
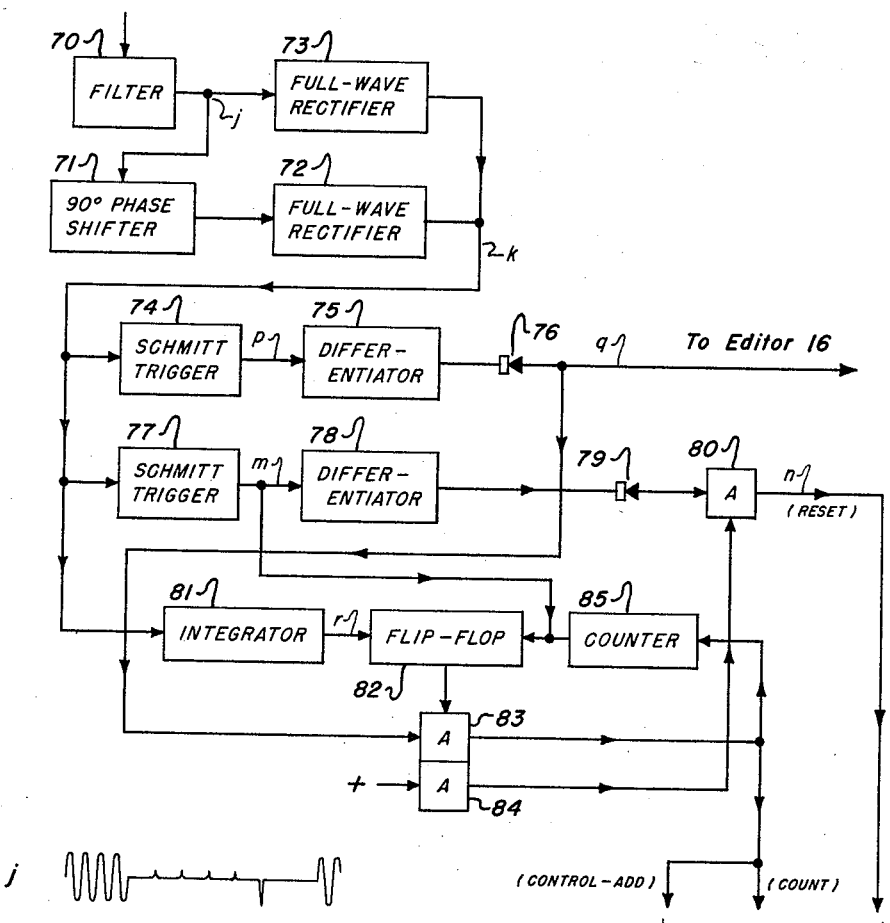
Figure 13:
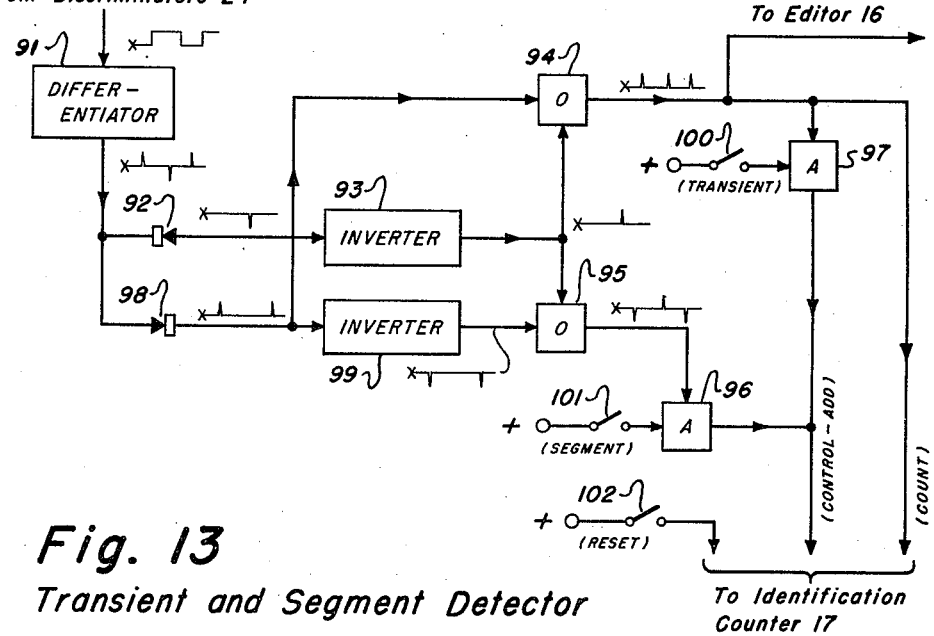
Figure 14:
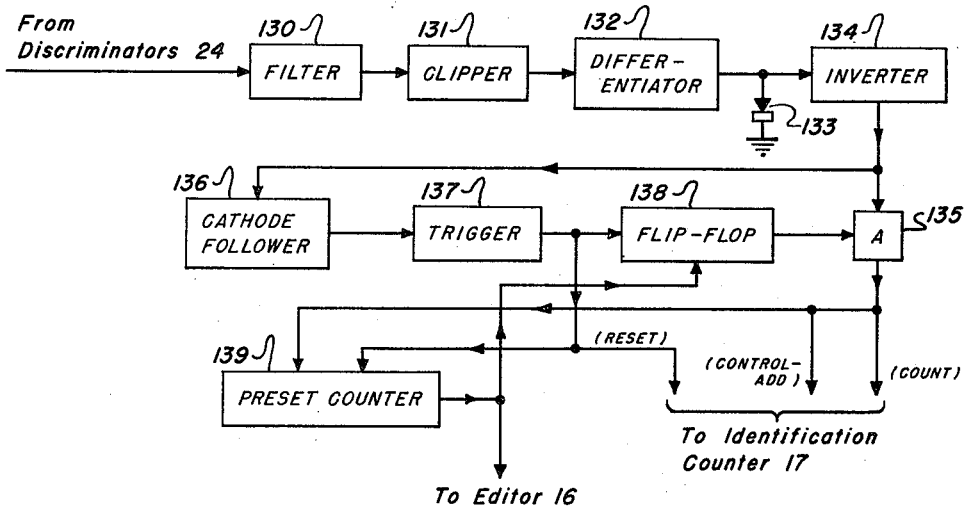
Figure 15:
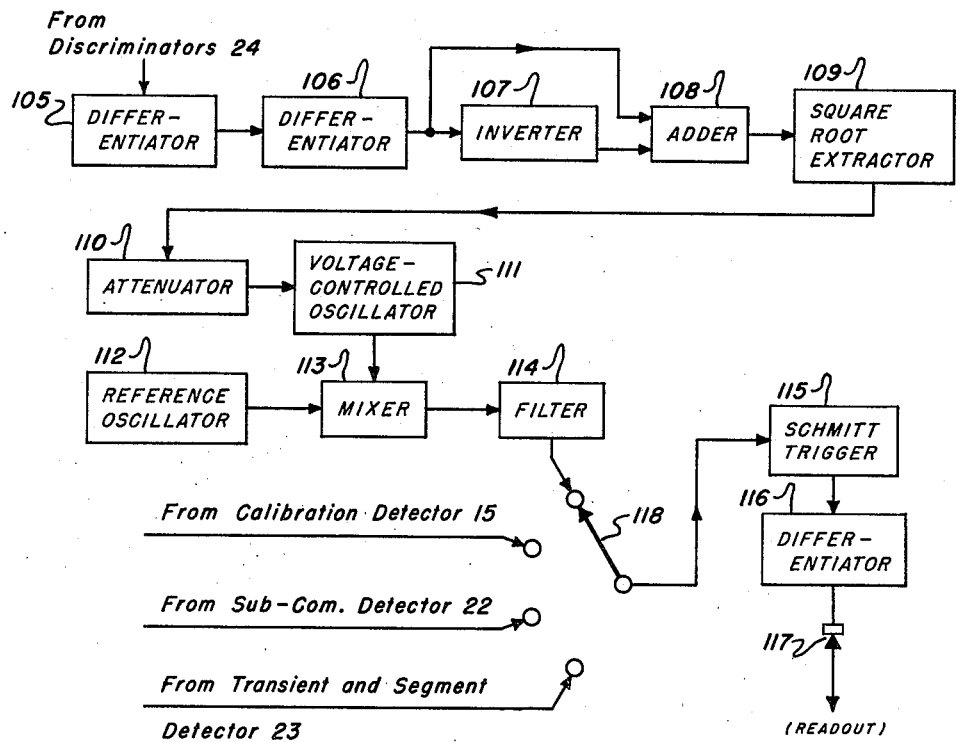
Figure 16:
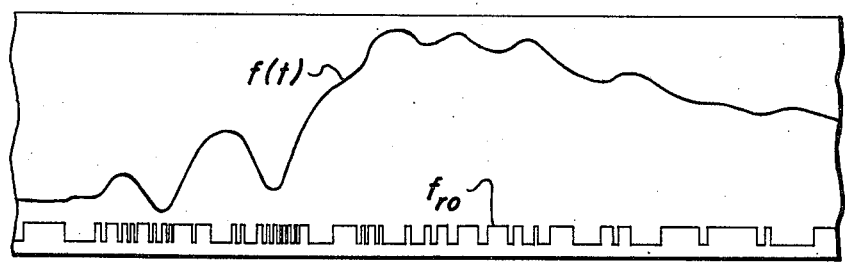
Figure 17:
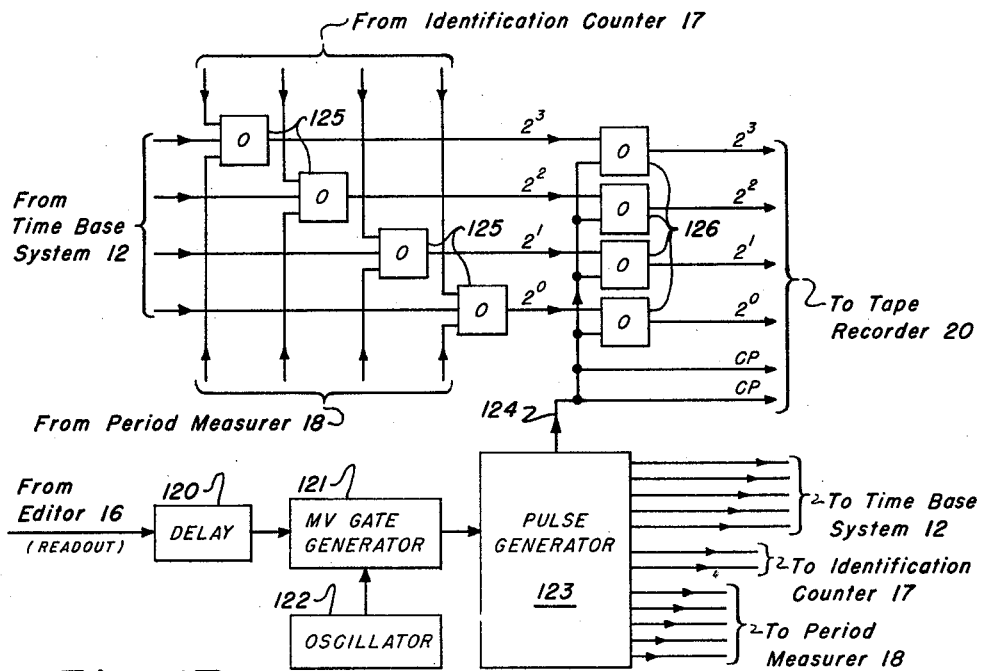

Fig. 3 represents a calibration signal;
Fig. 4 shows sub-commutated data;
Fig. 5 indicates segmented data;
Fig. 6 shows the transmission of time signals by means of pulses, known as event data;

Fig. 7 shows the transmission of time signals by means of a stepped waveform, another form of event data;

Fig. 8 represents continuous measurement of a changing phenomenon;

Fig. 9 is a block diagram of the time base system;

Fig. 10 is a block diagram of the Period measurer;

Fig. 11 shows some of the waveforms of voltage vs. time associated with the Period measurer;

Fig. 12 is a block diagram of the calibration detector, along with associated waveforms;

Fig. 13 is a block diagram of the transient and segment detector;

Fig. 14 is a block diagram of the sub-com. detector, used for detecting sub-commutated data;

Fig. 15 is a block diagram of the editor;

Fig. 16 shows two of the waveforms associated with operation of the editor;

Fig. 17 is a block diagram of the word assembler; and

Figure 18:
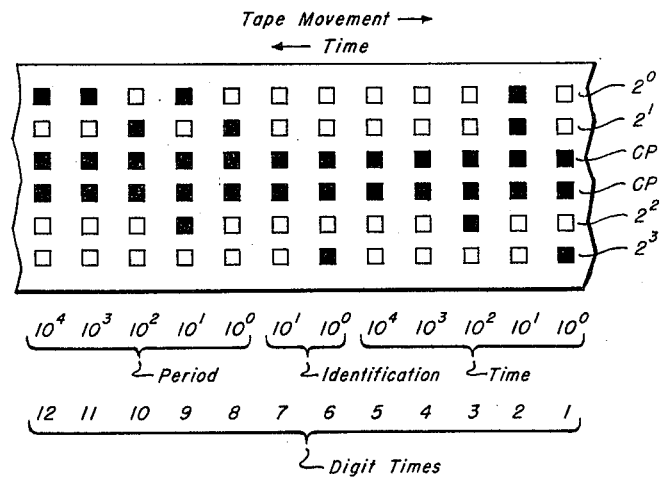

Fig. 18 shows an example of a "word" of information recorded on magnetic tape as the output of the invention.

Within the various block diagrams, any block labeled "O" represents an "Or" circuit, which is a well-known computer circuit producing an output voltage when a voltage is applied to either or both of its input terminals. Any block labeled "A" represents an "And" circuit which responds with an output signal only when voltages are applied to both of its input terminals.

Figure 1:
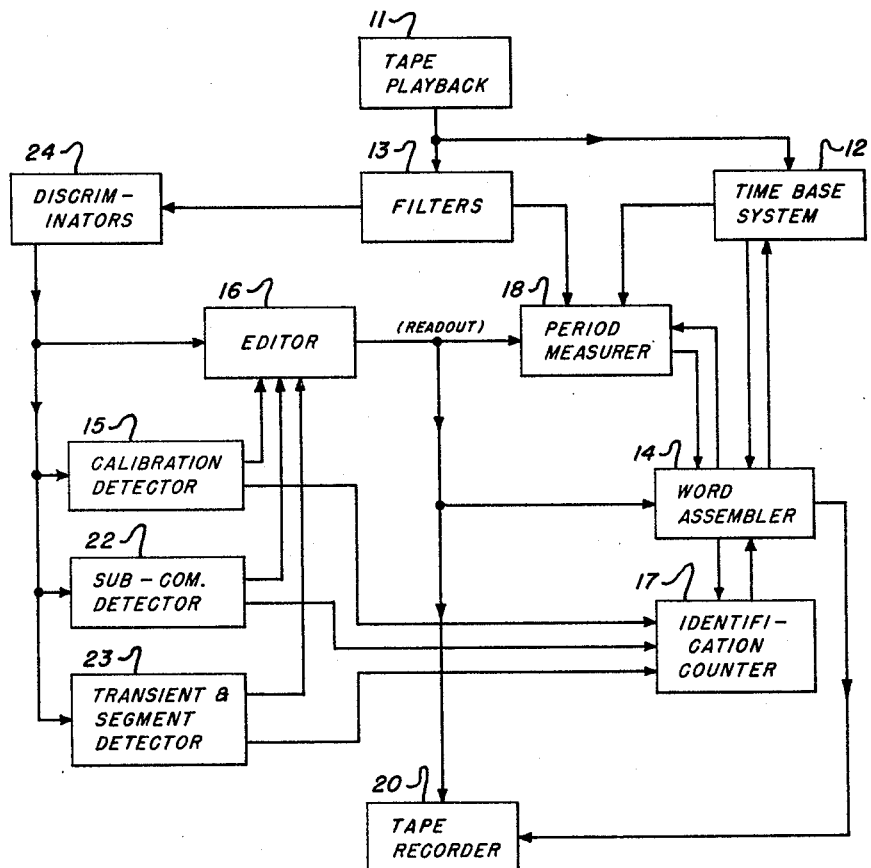
Fig. 1 is a greatly simplified block diagram of a preferred embodiment of the invention, showing the equipment used to play back the recorded composite signal, convert the recorded information into digital pulses, and record the digital information on magnetic tape.

In Fig. 1, tape playback 11 reproduces the recorded composite signal and feeds it to time base system 12 and filters 13. The time base system has two functions, the first of which is to furnish an accurate indication of elapsed time to word assembler 14, so that each readout may be correctly logged in time. The second function is to furnish unit and vernier pulses to be used in Period measurer 18 in accurately measuring the Period of the information signal.

The composite signal is filtered by one of several filters 13 which allows only the desired subcarrier to pass to Period measurer 18. The need for a readout command signal is filled by editor 16 and the several detectors associated therewith. These circuits operate from the analog signal which is the output of discriminators 24. The action of the discriminators is the usual one, being a demodulation of the frequency-modulated subcarrier to obtain the analog signal.

The analog signal may be of several types, but in any case at its start it appears as shown in Fig. 3. This is a calibration signal created in response to known, induced changes in the phenomenon to be measured. The signal is necessary so that later analog signals produced by a transducer can be translated into conventional units of measurement after playback.

A cycle of calibration signal is seen to consist of a low-frequency sinusoidal burst, followed by a stepped waveform, followed by a sampling of the output of the transducer being calibrated. In practice, the steps are sufficient to traverse the complete subcarrier frequency band in equal increments, thereby calibrating the whole band for future use in the transmission of data. Calibration detector 15 responds to the calibration signal and causes editor 16 to initiate a readout of the signal at each step. Identification counter 17 assigns a number to each step and the identifying digits in the form of pulses are stored in an electronic counter until called for by word assembler 14.

Upon receipt of the readout signal from editor 16, Period measurer 18 generates a gate pulse whose time duration is equal to a predetermined number of cycles (a Period) of the calibrate signal. (It should be remembered that the calibration signal being acted upon by the Period measurer is still in its frequency-modulated subcarrier form and does not appear as shown in Fig. 3.) Pulses from time base system 12 are counted within the Period measurer while the generated gate is open and are stored, furnishing a measurement of gate duration and hence a measurement of the Period of the calibrate signal to the word assembler upon demand. The readout signal also operates the controls of tape recorder 20, starting the magnetic tape moving. Constant frequency clock pulses within word assembler 14 transfer the totals from electronic counters in the Period measurer and the identification counter to tape recorder 20, where they are recorded.

Fig. 4 shows a sample of subcommutated data in which measurements of four phenomena are successively represented as sub-commutations, each series of four being preceded by a relatively long sync pulse to establish the order. Sub-com. detector 22 of Fig. 1 commands editor 16 to initiate a readout at a chosen one of the four measurements after feeding a pulse to identification counter 17 at each previous sub-commutation, so that each readout is identified by the total of counts as related to the correct phenomena. Word assembler 14 works as described in connection with the calibrate signal except that, in addition, recordings of elapsed time are made at each readout.

Segmented data, shown in Fig. 5, is created by a transducer which repeatedly sweeps across a prescribed voltage range in response to a changing phenomenon. Each traversal is known as a segment and must be serially numbered in order that the data can be correctly interpreted.

Figs. 6 and 7 indicate the occurrence of transient phenomena by pulse and step deviations in analog voltage respectively. Transient and segment detector 23 responds to the waveforms of Figs. 5, 6, and 7, and commands editor 16 to initiate a readout at each sudden change in voltage. These waveforms are used to initiate readouts of time only, since the amplitudes of the signals convey no information. The readouts are serially numbered by identification counter 17 and the total stored until read out by word assembler 14. The recording of the "word" describing the reading is accomplished as with other kinds of data previously described. As will be explained later in full, each word includes a time measurement, identification, and a measurement of the Period of the information signal. Referring again to Fig. 5, the non-linearity of segment 3 at its first representation portrays a condition of reversal of trend in the phenomenon, causing the first part of segment 3 and the last part of segment 2 to be re-traversed before the original trend resumes and those parts are again traversed. This type of behavior, not uncommon, is increased reason for maintaining an accurate numbering of the segments.

The most common type of telemetering signal, a random-appearing deviation in analog voltage, is shown in Fig. 8. Editor 16, in a manner to be described later in more detail, automatically commands readouts of frequency and time at intervals which will represent the waveform to the desired degree of accuracy, according to the degree of non-linearity of the waveform.

Figure 2:
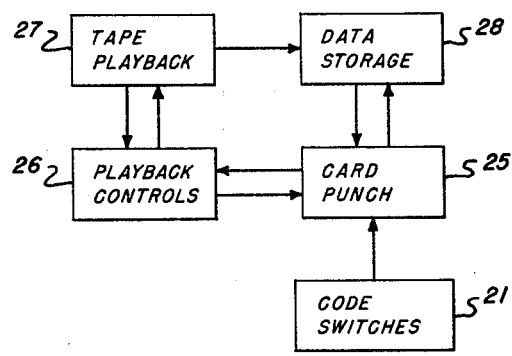
Fig. 2 is a block diagram of apparatus used in changing the means of storage of the digital information from magnetic tape to punched cards.

The product of the circuit of Fig. 1 is a series of words equally spaced on magnetic tape. It is usually required that this data be in a different form, in order that it can be used in an electronic computer. One form, compatible with certain computers, is the punched card, wherein the locations of holes in the card indicate values. Fig. 2 is a block diagram of equipment for transferring the tape-recorded data to punched cards. Code switches 21 are set to introduce information such as date, type of data being recorded, and the number of subcarrier periods in a Period, into each card punched. Card punch 25 runs freely, punching cards at the maximum rate, about 100 per minute. As soon as one card is punched, the playback controls 26 are signaled and tape playback 27 operates long enough to reproduce a word to data storage 28, where it is stored in a thyratron matrix. A signal from card punch 25 at the proper time causes the matrix information to be punched on a card, and the whole process repeats. Thus the composite telemetering signal, originally recorded on magnetic tape, is reduced to the number of punched cards which represent readings taken at points in the signal, the location of those points within the signal being determined by the invention, instead of by a human.

Time base system

As shown in Fig. 9, the time base system operates from the composite signal which it obtains from tape playback 11. The time portion of the composite signal comprises two sinusoidal signals having slightly different frequencies and known as the unit and the vernier signals. Unit filter 30 passes only the unit signal, which is converted into unit pulses by pulse generator 36. Vernier filter 34 passes the vernier signal, which is converted into vernier pulses by pulse generator 35. The unit and vernier pulses are transmitted to Period measurer 18.

The filtered unit signal synchronizes unit oscillator 31 and the oscillator output is converted into pulses by pulse generator 32. The use of unit oscillator 31 is to provide a continuous time base signal in spite of interruptions in the unit signal due to faults in the recording tape. At the same time, however, the oscillator will follow signal variations due to wow, since it is synchronized with the unit signal.

On receipt of a "start" signal from switch 29 at the beginning of the telemetering record following the calibration signal, And gate 33 is enabled and passes unit pulses from pulse generator 32 to the first decade of time counter 37. The counter is a 5-decade binary-coded decimal system. A running total of elapsed time is kept in the counter, and a readout of time is accomplished when digit pulses from word assembler 14 are applied to And gates 38 associated with the binary stages of each decade. All binary stages of a particular decade are read out simultaneously, the decades being read out sequentially. The presence or absence of pulses on the leads going to word assembler 14 from the And gates indicates the presence or absence of binary bits in the binary stages.

Period measurer

Period measurer 18, shown in the detailed block diagram of Fig. 10, first generates a gate waveform having a duration equal to a predetermined number of cycles of the information signal, then by means of the unit and vernier pulses measures the time duration of the gate. In this indirect manner is obtained a measurement of the frequency of the information signal, and hence of the information it represents. In performing its first function, the Period measurer operates as a converter from frequency modulation to pulse-width modulation. Since the conversion is made over a number of cycles of the information signal, there is a smoothing of intermodulation errors, which errors would be quite noticeable in a one-cycle conversion system.

On receipt of a readout pulse from editor 16, flip-flop 40 applies a steady enabling voltage to And gate 41. The information signal arriving from filters 13 is converted to pulse form by pulse generator 42 and the pulses, each representing a positive-going crossover of the alternating information signal, pass through gate 41 and are applied simultaneously to preset counter 43, And gate 44, and flip-flop 45. The flip-flop immediately changes state on receiving the first information pulse, forming the leading edge of the desired gate waveform practically in time coincidence with the pulse.

Preset counter 43 counts a preset number of information pulses, one less than the number desired in the Period, then emits an enabling pulse of relatively long duration which holds gate 44 open long enough for the next information pulse (the last one in the Period) from gate 41 to pass on to flip-flop 45. This returns the flip-flop to its original state, forming the trailing edge of the output gate waveform coincident with the last information pulse. That pulse also changes the state of flip-flop 40, which disables And gate 41 and prevents further information pulses from entering the preset counter. Preset counter 43 is reset by the last pulse, making it ready for the next readout. By utilizing the first and last information pulses in the Period to form the leading and trailing edges of the gate waveform, circuit delays within the preset counter (which vary with the preset time interval) are avoided. This is an important feature of the Period measurer which helps make possible a high degree of accuracy in the data conversion.

The measurement of the time duration of the precise gate waveform is accomplished by gating time base pulses and counting them. In designing this portion of the apparatus it was found that the desired accuracy (one microsecond) would require a time base frequency of one megacycle per second, whereas the maximum frequency which could be recovered from magnetic tape was 100,000 cycles per second. By adopting an electronic vernier system operating at 100,000 cycles per second, the accuracy of a one-megacycle system has been obtained without the counting inaccuracy of ± one cycle which is inherent in the usual system in which time pulses are gated and counted.

The electronic vernier is best explained with reference to the waveforms shown in Fig. 11. Time base unit pulses, shown in diagram $b$, occur at ten-microsecond intervals. The precise gate waveform $a$ has a duration of 134 microseconds and its leading and lagging edges do not coincide with unit pulses. If the unit pulses bracketed by the gate were used alone to measure the duration of the gate, a duration of 120 microseconds would be indicated, fourteen microseconds less than the actual duration. The purpose of the electronic vernier is to measure the time periods $t_1$ and $t_2$ with an accuracy of ± one microsecond, the measurements to be added to the measurement obtained by gating unit pulses. Two trains of vernier pulses are used, the trains being initiated at the beginning and end, respectively, of the gate waveform $a$. The period of the vernier trains is one-tenth greater than that of the time base, so the vernier pulses "gain" on the time base pulses at the rate of one microsecond per vernier period and some time during the vernier train a vernier pulse coincides with a time base pulse. In the example shown this happens at time $t_3$ in the first vernier train and at time $t_4$ in the second. The time period $t_1$ which is measured by the first vernier train is seen from waveform $b$ to be six microseconds. From the start of the first vernier train to time $t_3$, six vernier periods have elapsed. These periods can be indicated by a pulse counter which counts the vernier pulses, seven of them, occurring from the start of the first vernier train up to and including coincidence time $t_3$. Thus, the count indicates one in excess of the number of microseconds in the time period $t_1$.

Time period $t_2$ is eight microseconds long and is measured by the second vernier train. This is accomplished by counting vernier pulses remaining in the second vernier train after the coincidence time $t_4$. It is seen that this count is seven, one less than the number of microseconds in time period $t_2$. Since all that is of interest is the total time duration of the gate waveform $a$, time periods $t_1$ and $t_2$ can be added by adding the pulses counted in the first vernier train to those counted in the second. It is seen that the excess of one count in the first vernier count will cancel the deficiency of one count in the second vernier count, giving a correct measurement of the times $t_1+t_2$, to be added to the measurement of the time between the times $t_1$ and $t_2$.

This latter measurement could be made by counting unit pulses gated by gate waveform $a$, but frequently the first of a series of gated pulses is attenuated and not counted. For instance, see the pulses in waveforms $e$ and $g$ at time $t_4$ and $t_3$, respectively. To prevent this possibility of error, vernier pulses of the first train are counted in place of the unit pulses up to and including the time of coincidence, then unit pulses are counted up to and including the second time of coincidence, then the remaining vernier pulses of the second train are counted in place of unit pulses. This results in a constant excess of eleven counts in the unit counter regardless of the Period length, which excess can be subtracted easily from every Period measurement by computers operating from the output of the present invention.

Referring again to Fig. 10, the negative gate waveform generated by flip-flop 45 is differentiated by differentiator 46 and applied to negative Or gate 47 and inverter 48. Since the Or gate passes only negative pulses, the first pulse from the differentiator passes directly, while the second passes only after inversion. Thus Or gate 47 yields a pair of negative pulses 62 and 63 which define the gate waveform and are used to initiate a pair of trains of vernier pulses.

As previously mentioned, the unit and vernier signals were mixed with the information signal and recorded on tape so that any wow introduced during recording would affect all signals equally. Now that the vernier signal is to be used in connection with measuring the period of time between pulses 62 and 63, it is necessary that the effect of wow on the vernier signal be retained. Another requirement is that two trains of vernier pulses, commencing in time coincidence with pulses 62 and 63 respectively, be selected from the continuous stream of vernier pulses from pulse generator 35. A novel use of electrostatic memory tube 49 makes possible the retention of the wow effects on the vernier pulses, while at the same time converting the random relationship of the vernier pulses to pulses 62 and 63 to a precise relationship in which the beginnings of the two vernier trains coincide with the two pulses in time. In effect, a group of ten successive vernier pulses is shifted in time so that the first one coincides with the appropriate pulse (either 62 or 63).

The vernier pulses from pulse generator 35 are applied to circular sweep generator 50, which is of the general type described in Electronics Manual for Radio Engineers, 1949 ed., pp. 144–148. The output of the generator is connected to the deflection plates of the memory tube, causing the electron beam to follow a circular path on the tube face at the rate of one revolution for every vernier period. Pulse 62 triggers blocking oscillator 51 and a strong positive pulse is then applied to the grid of memory tube 49. This causes an instantaneous intensification of the electron beam, heavily bombarding a small spot on the tube face with electrons, so that secondary emission takes place. The resulting negatively charged spot remains on the glass tube face in the path of the circular trace. Copper screen 52 is cemented on the outside of the tube face and conducts a capacitive discharge from the face every time the electron beam intersects the charged spot. Thus a series of current pulses are generated at the frequency of the vernier pulses, starting with the occurrence of pulse 62. The current pulses flow through resistor 53, creating voltage pulses of the vernier train, which are applied to gate 54. It is seen that any wow in the vernier signal will affect the frequency of revolution of the electron beam, and hence will likewise affect the spacing between individual pulses of the vernier train.

Pulses 62 and 63 are applied also to delay multivibrator 55, which is in turn connected to multivibrator gate generator 56, whose output is a delayed positive gate waveform equal in duration to ten vernier periods. This waveform enables And gate 54 so that a vernier train of ten pulses will pass through the gate from screen 52. The purpose of delay multivibrator 55 is to delay the enabling gate until after the charged spot is created on the face of tube 49. This is necessary because the first vernier pulse resulting from the charged spot is much too large in comparison with the later pulses in the train for use in the circuits which follow.

The various waveforms $a$ through $g$ of Fig. 11 may be observed at the places indicated in the circuit of Fig. 10. Flip-flop 57 normally enables And gate 58 so that vernier pulses pass through the gate to the first decade of counter 64 as well as through Or gate 61 to the second decade. And gate 59 is momentarily enabled by each unit pulse from pulse generator 36. Thus, each pulse of the vernier train, although applied to gate 59, will not pass therethrough unless it is in coincidence with an enabling unit pulse. When coincidence occurs, as at times $t_3$ and $t_4$, flip-flop 57 is triggered by the vernier pulse which passes through gate 59, and gate 58 is disabled coincidentally with the enabling of And gate 60. This is accomplished because the two plates of conventional flip-flop 57 are connected to gates 58 and 60. Waveforms $d$ and $f$ of Fig. 11 illustrate the enabling and disabling pulses respectively from the flip-flop. Thus, when flip-flop 57 is triggered, say at time $t_3$, the train of vernier pulses to counter 64 is interrupted and unit pulses begin passing through gate 60 and Or gate 61 to the second decade. See waveform $g$.

The second vernier train is initiated by pulse 63, but is not passed by And gate 58 since the gate is disabled. At time $t_4$, however, a vernier pulse of the train coincides with a unit pulse and the vernier pulse is passed by And gate 59, triggering and changing the state of flip-flop 57. This enables And gate 58 and disables And gate 60, so that the flow of unit pulses to the second decade is interrupted and the remaining pulses in the second vernier train proceed to the first and second decades instead. Thus, each vernier pulse properly registers in the first decade of the counter as representing $\frac{1}{10}$ the time interval represented by each unit pulse, and in the second decade as would a unit pulse. Every tenth vernier pulse applied to the first decade is transmitted to the second decade via Or gate 61. Readout of the counter totals is accomplished by means of And gates in the same manner as it is in connection with the Time Base System of Fig. 9.

*Calibration detector*

The calibration detector and associated waveforms are shown in Fig. 12. The analog signal from discriminators 24 is passed by filter 70 in the form of waveform $j$. The sinusoidal burst is passed completely while the stepped waveform is represented by small voltage pips. In order to develop a master voltage pulse from the sinusoidal burst the signal is first shifted in phase 90° by phase shifter 71, then rectified by fullwave rectifier 72. The output is added to that of full-wave rectifier 73, the result being a positive voltage pulse having very little ripple due to the phase difference in the two added voltages. Another effect of the rectification is that all the pips become positive.

Schmitt trigger 74 triggers at a low level and produces a rectangular pulse for the master pulse and for each of the pips. These pulses are differentiated by differentiator 75 and the negative pulses of the resulting waveform are passed by diode 76 to be used as readout pulses in editor 16. Thus, a readout occurs at the end of the master pulse and at every change of level in the waveform of Fig. 3.

Schmitt trigger 77 triggers at a high voltage level and therefore produces a rectangular pulse only for the master pulse and for the last pip in the calibration sequence. The output of the Schmitt trigger is differentiated by differentiator 78 and the negative pulses of the resulting waveform are passed by diode 79 to And gate 80. When the gate is enabled the pulses are passed to the identification counter 17, where they reset the counter.

Waveform $k$ is integrated by integrator 81 thereby reducing the amplitude of the pips so that only the leading portion of the master pulse will trigger flip-flop 82. When so triggered the flip-flop enables And gates 83 and 84, the latter in turn passing a positive voltage to enable And gate 80. While enabled, And gate 83 passes waveform $q$ to counter 85 and to identification counter 17. The identification counter assigns an identifying number to each negative pulse, and hence to each step of the waveform of Fig. 3. Counter 85 has a capacity of five counts, so that the fifth pulse of waveform $q$ passes through the counter and triggers flip-flop 82 to its other state. This enables And gate 83, preventing the transmission of additional pulses to the identification counter. And gate 84 is disabled at the same time, preventing the transmission of additional reset pulses to the identification counter. As insurance that flip-flop 82 is triggered, the output of Schmitt trigger 77 is also applied, the last pulse of waveform $m$ acting to trigger the flip-flop in the event that the fifth pulse from counter 85 failed to do so.

Thus it is seen that the calibration detector recognizes the calibration waveform, emits a readout signal at each change in level of the waveform, and furnishes counting, control and reset pulses to the identification counter.

*Identification counter*

Identification counter 17 (not shown in detail) is a conventional two-decade reversible counter which is controlled entirely by one of the three detectors, calibration detector 15, sub-com. detector 22, or transient and segment detector 23, as determined by the setting of an internal switch. Any of the detectors controls the identification counter by reset pulses, which reset the counter to zero; by count pulses, which add to or subtract from the total in the counter; and by control pulses, which place the counter in condition to add when they are positive and to subtract when they are negative. Readout of the counter decades is accomplished by means of And gates in the same manner as shown and described in connection with the Time Base System of Fig. 9.

*Transient and segment detector*

Transient and segment detector 23, shown in Fig. 13, acts upon analog signals of the types shown in Figs. 5, 6, and 7. These signals are received from discriminators 24 and are representative of either segmented data or transient data. In response to the signals, the detector furnishes count and control pulses to identification counter 17, and readout pulses to editor 16. Switch 102 provides means for applying a reset pulse to the identification counter.

The incoming analog signal, for example the waveform of Fig. 7, is differentiated by differentiator 91 and any resulting negative pulses pass through diode 92 and are inverted by inverter 93. The positive output pulses of the inverter pass through Or gate 94 and are conducted to editor 16 to initiate readouts, and to identification counter 17 where they are counted.

At the same time, any positive pulses in the output of differentiator 91 are passed by diode 98 and Or gate 94, where they are applied to And gate 97 and also are used as readout and count pulses. The negative pulses from inverter 99 join positive pulses from inverter 93 in Or gate 95 and are transmitted to And gate 96.

If a transient analog signal is being analyzed, it is desirable that the identification counter be kept in an adding state regardless of the polarity of pulses leaving differentiator 91. In that instance, therefore, switch 100 is closed and switch 101 remains open. This enables And gate 97 and disables And gate 96, so that only positive control pulses, from Or gate 94, are sent to identification counter 17. Thus, the counter is kept in an additive state and one count is added to the total at each readout.

If segmented data such as that shown in Fig. 5 is being analyzed, switch 100 is opened and switch 101 is closed, disabling And gate 97 and enabling And gate 96. This allows both negative and positive pulses to be transmitted to identification counter 17 as control pulses, changing the sense of the counter from additive to subtractive as desired. This is necessary to insure that each segment in the waveform of Fig. 5 retains its unique number, even if the transducer reverses its trend and portions of a segment are duplicated in transmission.

Perhaps this is better understood if the result of applying the waveform of Fig. 5 to the detector is more closely examined. Then it is seen that differentiator 91 will emit negative pulses coincident with the trailing edges of segments zero, one, and two. In the examples shown, the transducer reverses its trend midway through segment three and the differentiator emits a positive pulse as the trailing edge of segment two is re-traversed. This sends a control pulse of reverse polarity to the identification counter, causing it to subtract a pulse from the total therein. The transducer again reverses its trend within segment two and as the trailing edge of segment two is traversed again in the original direction, the coincident control pulse is again positive, causing a pulse to be added to the total in the identification counter. Thus, the correct identification number for each segment is retained in spite of two reversals of trend by the transducer.

*Sub-com. detector*

Sub-Com. detector 22, shown in Fig. 14, receives its signal from discriminators 24 and operates in response to the waveform of Fig. 4. This waveform represents sub-commutated data, which has the characteristic of a sync pulse of long time duration followed by a series of information pulses of varying amplitudes but having a common short time duration in comparison to that of the sync pulse. Although Fig. 4 shows only four information pulses, sometimes as many as twenty-seven pulses are present, depending upon the system in use. It is the purpose of the sub-com. detector to read out a particular information pulse as it is reached in every sequence. Thus, in order to read out all of the information in a sub-commutated channel, it is necessary to pass the recording tape through the system a number of times equal to the number of information pulses present in each sequence.

The analog signal is passed by low-pass filter 130 and clipped and inverted by clipper 131, so that all the pulses have the same amplitude. The pulses are then differentiated by differentiator 132 and the positive pulses of the resulting waveform are passed to ground by diode 133. The negative pulses of the waveform, which correspond to the leading edges of the pulses of Fig. 4, are inverted by inverter 134 and applied to And gate 135.

The positive pulses from the inverter also pass through cathode follower 136 to trigger 137. The output circuit of the cathode follower has a long time constant, such that the circuit will not discharge between successive pulses representing the leading edges of information pulses, but will discharge between the leading edge of the sync pulse and the leading edge of the first information pulse. Discharge of the output circuit triggers trigger 137, changing the state of flip-flop 138 which applies and enabling voltage to And gate 135. Thus, it is seen that the And gate is enabled only on the occurrence of a sync pulse.

The output of trigger 137 also resets identification counter 17 and preset counter 139 to zero. The counter is preset to supply an output pulse when a certain total is reached. With And gate 135 enabled, pulses representing the information pulses pass through the gate and are sent to identification counter 17 as count and additive control pulses. They also are counted by the preset counter. When the preset total is reached, indicating the occurrence of a particular information pulse, the preset counter emits a pulse which returns flip-flop 138 to its original condition, disabling And gate 135 and preventing additional pulses from entering the counter. The counter output pulse also is transmitted to editor 16 where it commands a readout. As the readout is made, the total in the identification counter is recorded as identification of the specific sub-commutated pulse being read out.

This procedure is repeated for each cycle of sub-commutated data until the entire telemetering record has been read out. Then the preset counter is set for a different total so that another channel of information may be read out in the same manner.

Editor

Editor 16, which is shown in a detailed block diagram in Fig. 15, generates readout pulses at a frequency proportional to the square root of the second derivative of a signal such as that depicted in Fig. 8. This is based on a mathematical theory which has proved that a readout frequency thus derived will come very close to duplicating the editing procedure of a human operator. Mathematically, $$f_{ro} = \sqrt{\left|\frac{f''(t)}{8e}\right|}$$

where $e$ is the maximum amount (expressed as a percentage of bandwidth) that a straight line connecting adjacent readout points deviates from the curve, as shown in Fig. 8; $f(t)$ is the waveform of Fig. 8; and $f_{ro}$ is the frequency of readout pulses.

As shown in Fig. 15, the information signal is first differentiated by differentiator 105 to obtain $f'(t)$, then differentiated a second time by differentiator 106 to obtain $f''(t)$. The negative portions of the second derivative are inverted by inverter 107 and added to the positive portions by adder 108, yielding $|f''(t)|$. The resultant waveform is applied to square root extractor 109 where its square root is taken. The square root extractor 109 may be of the type described in page 692 of volume 19 of the MIT Radiation Laboratory Series.

Attenuator 110 scales down the output $\sqrt{|f''(t)|}$ of the square root extractor proportional to the desired value of $8e$ and the resulting signal $$\sqrt{\left|\frac{f''(t)}{8e}\right|}$$

controls the frequency of voltage-controlled oscillator 111 proportional to its amplitude. It is seen that the output of the oscillator is a signal whose frequency is proportional to the square root of the second derivative of the information signal.

Reference oscillator 112 generates a fixed frequency signal which is mixed by mixer 113 with the signal generator by oscillator 111. Low-pass filter 114 allows only the portion of the mixed signal having the frequency which is the difference between the frequencies of the two oscillator signals to pass to Schmitt trigger 115. The Schmitt trigger generates a square wave having the difference frequency. Differentiator 116 differentiates the square wave and only the negative pulses of the resulting waveform are passed by diode 117 to be used as readout pulses at several places in the system.

It will be recognized that the use of reference oscillator 112 will not be necessary in those instances where the frequency of the signal obtained from voltage-controlled oscillator 111 is suitable for use in triggering Schmitt trigger 115 directly. For some purposes, however, oscillator 111 cannot be made to oscillate at a low enough frequency for readouts, in which case reference oscillator 112 is employed as before described. When it is employed, it is seen that the frequency of the signal from the reference oscillator will determine the lowest frequency of the readout pulses. Therefore, it is desirable that the reference frequency be adjustable to a small degree.

In order that the editor may provide readout signals in response to the information signals of Figs. 3, 4, 5, 6, and 7, as well as that of Fig. 8, switch 118 is provided. According to its setting, a switch connects the input of the Schmitt trigger to the output of low-pass filter 114 or to any one of the three detectors, 15, 22, or 23.

Fig. 16 shows an example of the input waveform $f(t)$ of the editor, compared with the output waveform $f_{ro}$ of Schmitt trigger 115. It will be noticed that the sampling or readout frequency varies considerably with the trend of the information signal. For instance, while the linearity of the amplitude of the information signal is changing abruptly or rapidly, readouts (indicated by the falling edges of the $f_{ro}$ waveform) are occurring quite rapidly. However, at the righthand portion of $f(t)$, the scarcity of amplitude linearity change in the information signal causes readouts to occur only at nearly the minimum rate. By way of contrast, if a constant sampling rate were chosen which were high enough to give an accurate representation of the early part of the information signal, many readouts would be wasted because of the lack of necessity for them at the linear portion of the signal. This shows the value of the editor in conserving readouts.

Word assembler

Word assembler 14, shown in block diagram form in Fig. 17, operates in response to a readout signal from editor 16 to assemble the information obtained at each readout so that it may be recorded as a word on magnetic tape. The readout signal is delayed by delay 120 long enough for Period measurer 18 to complete its function and for tape recorder 20 to be actuated, then the delayed readout signal triggers multivibrator gate generator 121. This gates twelve cycles of the sine wave signal from oscillator 122 into pulse generator 123, where the sine wave crossovers are converted into voltage pulses. Twelve clock pulses (CP) equally spaced in time are transmitted out of the pulse generator on line 124, while twelve digit pulses occurring at the same time (digit times one through twelve), but of opposite polarity to the clock pulses, are transmitted out of the pulse generator on twelve other separate lines.

The first five digit pulses are transmitted, in sequence, to the five decades of counter 37 of the time base system (Fig. 9), each pulse reading out the conditions of the four binary counters in its respective decade by use of the associated And gates 38. The presence of a binary bit from a binary counter at any And gate enables the gate, allowing the digit pulse to pass through to the appropriate Or gate of the group 125 in the word assembler, then on to an Or gate of the group 126 where it meets a clock pulse having opposite polarity. The two pulses cancel one another, so that nothing is transmitted on to tape recorder 20. However, the absence of a binary bit at any And gate in counter 37 disables the And gate so that an arriving digit pulse will not pass. The corresponding clock pulse arriving at an Or gate of group 126 will then pass through to the tape recorder. The result is that the complement of the number registered in counter 37 is recorded, instead of the number itself. This is no problem, since the number is readily determined from its complement, and the procedure has the advantage of using the more perfect clock pulses for recording, rather than the digit pulses, which are distorted from passage through a greater amount of circuitry.

Digit pulses six and seven read out identification counter 17 in the same manner. In turn, digit pulses eight through twelve read out counter 64 of Period measurer 18. At each digit time, regardless of whether or not a recording pulse is transmitted to the tape recorder from Or gates 126, clock pulses are transmitted to the tape recorder on two lines as an indication of proper operation of the circuitry. If the clock pulses were not recorded, there would always be a question of whether the circuits were operating properly when there was an absence of recording pulses from the Or gates.

Thus, at each readout the series of twelve digit pulses cause successive recordings of the totals in the decades of the time base system, the identification counter, and the Period measurer. The whole process takes only 1.7 milliseconds and results in the formation of a word of information for each readout.

Tape recorder

Tape recorder 20 operates intermittently, starting tape movement upon receipt of a readout pulse from editor 16 and stopping the movement at the end of a word. Thus the words are equally spaced upon the tape regardless of the rate of occurrence of readouts, resulting in a great saving in tape. The recording pulses arriving from Or gates 126 trigger blocking oscillators and the high-powered output pulses therefrom energize the recording heads, causing magnetic recording to occur. The organization of the tape recorder is conventional and is not shown in detail.

Fig. 18 shows a typical recorded word as it appears on a portion of the recording tape. The blackened squares indicate magnetized spots on the tape, while the unblackened squares merely show recording areas which are not magnetized in the example shown. The time recording is seen to be 438 microseconds, indicated by a magnetized spot in the $2^3$ channel at digit time one (eight units), magnetized spots in the $2^0$ and $2^1$ channels at digit time two (three tens, or thirty), and a magnetized spot in the $2^2$ channel at digit time three (four hundreds). A magnetized spot in the $2^3$ channel at digit time six identifies the eighth subcommutation or event occurrence. The locations of the magnetized spots at digit times eight through twelve indicate a Period measurement of 11,252 microseconds.

Summary

An analog-to-digital data converter has been described which will perform a job formerly requiring two man-weeks of work in about five hours, with an accuracy of $\frac{1}{10}$ of 1% of the bandwidth of a telemetering subcarrier frequency channel. The speed and accuracy of the invention are due in part to the unique method of operation of the Period measurer and of the editor. No effort has been made to show detailed circuitry, since the block diagrams are sufficient description for a person skilled in the art. A number of conventional control circuits have not been shown, for the same reason, and because the makeup of the control circuits would vary considerably from one application to another. Although a detailed specific embodiment of the invention has been shown, this has been done by way of example only and it is not intended as a limitation on the invention, which is described in the claims below.

What is claimed is:

1. In a telemetering system wherein frequency-modulated signals of different characteristics and frequencies are mixed to form a composite signal which is recorded, an analog-to-digital converter comprising: means for reproducing the composite signal; means for separating the composite signal into individual frequency-modulated signals according to their frequency ranges; means for demodulating an individual signal to yield an analog voltage $f(t)$; means for automatically initiating readouts proportional to the frequency of the frequency-modulated signal including means for deriving from the analog $f(t)$ a second voltage $f'(t)$ proportional to the time derivative of the analog voltage; means for deriving from the second voltage a third voltage $f''(t)$ proportional to the time derivative of the second voltage; means for deriving from the third voltage a fourth voltage $$\sqrt{\left|\frac{f''(t)}{8e}\right|}$$

of amplitude proportional to the square root of the absolute value of third voltage divided by an adjustable factor $8e$; means controlled by the fourth voltage for generating a readout signal whose frequency, $f_{ro}$, varies with the amplitude of the fourth voltage; means for measuring the time duration of a Period of the frequency-modulated signal at readout with reference to a time signal separated from the composite signal; means for representing the readout and the Period time measurement by digital voltage pulses; and means for recording said pulses.

2. An analog-to-digital converter as in claim 1, further including means responsive to analog calibration signals for initiating a readout at each step of the calibration; means responsive to analog event signals for initiating readouts at each event; and means responsive to analog segmented signals for initiating a readout at each segment.

3. An analog-to-digital converter as in claim 1, in which the time signal comprises a periodic unit signal having a certain frequency and periodic vernier signal having a frequency 10/11 times that of the unit signal, means for converting said unit signal into unit pulses, and including means for converting said vernier signal into vernier pulses, means for generating a first pulse at the beginning of the Period and a second pulse at the end thereof, means responsive to the vernier pulses for sweeping an electron beam at the vernier frequency in a circular pattern on the face of a cathode ray tube, means for increasing the intensity of the electron beam within the tube so that secondary emission occurs on the tube face coincident in time with the first and the second pulses, means for detecting each coincidence of the circular sweep with an area of secondary emission and for generating a vernier pulse in response thereto, a counter having at least a first and a second decade, gating means adapted to generate a first train of ten vernier pulses starting at a predetermined time after the first Period pulse, a counter gate circuit adapted to control unit and vernier pulses passing through to said counter, a vernier pulse gate circuit adapted to pass vernier pulses through said counter gate circuit to said first and second decades, a coincidence gate circuit adapted to be responsive to the coincidence of a vernier and unit pulse, a flip-flop circuit adapted to be energized at the response of said coincidence gate circuit, said flip-flop circuit disabling said vernier pulse gate circuit and enabling said unit pulse gate circuit to permit unit pulses to pass through said counter control gate to said second decade, said second Period pulse reactivating said gating means to generate a second train of vernier pulses starting a predetermined time after the second Period pulse to be applied to said coincident gate circuit, said flip-flop circuit adapted to disable said unit gate circuit and enable said vernier gate circuit in response to said coincidence gate circuit, whereby an accurate measurement of the time duration of the Period is registered in said counter.

4. In a telemetering system wherein frequency-modulated signals of different characteristics and frequency are mixed to form a composite signal which is recorded, an analog-to-digital converter comprising: means for reproducing the composite signal; means for separating said composite signal into individual frequency-modulated signals according to their frequency ranges; means for demodulating an individual signal to yield an analog voltage $f(t)$; means responsive to the non-linearity of $f(t)$ for automatically initiating readouts of the frequency of the frequency-modulated signal including; a first and second differentiator for producing a second derivative $f''(t)$ of said analog voltage $f(t)$, means for inverting negative pulses from said second differentiator, means for adding said inverted pulses to positive pulses from said second differentiator to yield an absolute value $$|f''(t)|$$

of the second derivative, circuit means for extracting the square root of said absolute value, means for attenuating the output signal $$|f''(t)|$$

from said circuit means to yield a readout frequency $$f_{ro}=\sqrt{\left|\frac{f''(t)}{8e}\right|}$$

where $e$ is the desired maximum departure of $f(t)$ from a straight line joining successive readouts; means for measuring the time duration of a Period of the frequency-modulated signal at readout with reference to a time base signal separated from said composite signal; means for representing said readout and said period time measurement by digital voltage pulses; and means for recording said pulses.

References Cited in the file of this patent
UNITED STATES PATENTS

| | | |
|---|---|---|
| 2,282,102 | Tunick | May 5, 1942 |
| 2,680,240 | Greenfield | June 1, 1954 |
| 2,812,510 | Schulz | Nov. 5, 1957 |